(12) United States Patent
Leonetti (10) Patent No.: US 9,808,108 B1
(45) Date of Patent: Nov. 7, 2017

(54) AUTOMATED PASTA DISPENSING DEVICE WITH BALL VALVE

(71) Applicant: Heading USA, Inc., Miami Beach, FL (US)

(72) Inventor: Fausto Leonetti, Narni (IT)

(73) Assignee: HEADING USA, INC., Miami Beach, FL (US)

(*) Notice: Subject to any disclaimer, the term of this patent is extended or adjusted under 35 U.S.C. 154(b) by 0 days.

(21) Appl. No.: 15/134,594

(22) Filed: Apr. 21, 2016

(51) Int. Cl.
*A47J 27/08* (2006.01)
*A47J 27/00* (2006.01)

(52) U.S. Cl.
CPC ...... *A47J 27/0802* (2013.01); *A47J 2027/008* (2013.01)

(58) Field of Classification Search
CPC .......................... A47J 27/0802; A47J 2027/008
USPC ........................ 99/403, 407, 404, 330, 357
See application file for complete search history.

(56) References Cited

U.S. PATENT DOCUMENTS

| | | | | |
|---|---|---|---|---|
| 5,142,966 A * | 9/1992 | Morandi | ............... | A47J 27/18 99/330 |
| 5,215,001 A * | 6/1993 | Narcisi | ............... | A47J 27/18 99/330 |
| 5,531,362 A * | 7/1996 | Bottacco | ............... | G01F 11/02 222/390 |
| 6,360,652 B1 * | 3/2002 | Cusenza | ............... | A47J 27/18 99/330 |
| 6,530,307 B2 * | 3/2003 | Cusenza | ............... | A47J 27/18 99/330 |
| 9,113,741 B2 * | 8/2015 | Foser | ............... | A47J 27/18 |

* cited by examiner

*Primary Examiner* — David Angwin
*Assistant Examiner* — Biniam Asmelash
(74) *Attorney, Agent, or Firm* — Mark Terry (57) ABSTRACT

A device for making and dispensing pasta comprises: a pressure cooking vessel; and a ball valve assembly comprising: i) a valve body coupled to a top opening of the vessel, and ii) a rotatable ball securely located within the valve body and rotatable between an open position and a closed position, the ball having a bore, wherein in the open position the bore provides access to the top opening of the vessel, and in the closed position the ball hermetically seals the top opening. The device also includes a means for dropping pasta through the bore and into the vessel; a means for rotating the ball to the closed position; a means for heating the interior volume of the vessel to cook the pasta; and a means for providing egress of the pasta from the device after the vessel has cooked the pasta.

3 Claims, 10 Drawing Sheets

AUTOMATED PASTA DISPENSING DEVICE WITH BALL VALVE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The disclosed embodiments relates to the field of food preparation, and more specifically to the field of automated food preparation.

BACKGROUND

All over the world, food preparers cook and serve ready-to-eat pasta helpings of the Italian influence, such as spaghetti, ravioli and the like. It is known that the cooking of the above mentioned typical Italian dishes is currently carried out in a traditional manner by one or more specifically designed operators, according to a sequence of steps performed by hand and often in an extemporary manner. Consequently the result depends on the operator's skill and the quickness of the service. Various factors affect the result, including the number of helpings to make ready in a given unit of time, the number of operators, and the quality of the ingredients. The above conventional system for preparing and serving pasta helpings suffers from the following practical drawbacks. First, the quality of the final product can vary from time to time or from dish to dish, depending on variations in the operator's skill, the quickness of the service, the supplied ingredients, etc. Secondly, the economics of using certain staff can highly affect the profitability of a commercial enterprise. Lastly, the conventional system for preparing and serving pasta helpings lacks an ability to be able to quickly and effectively scale the system to meet greater demand for pasta.

Known machines for automated cooking of pasta typically comprise an initial cooking chamber in which the pasta placed therein is processed with water or hot pressurized steam, and a second chamber in which the pasta product is placed after completion of the first cooking stage. Most of these machines are complicated affairs, are very expensive to manufacture, and even more costly to maintain. With few exceptions, their performance is unpredictable and leaves a great deal to be desired. By and large, these known machines are too unreliable and impracticable for commercial use.

Further, conventional methods of pasta cooking involve the hydration and cooking of pasta via immersion in boiling water. Pressure cooking at the resulting increased temperatures creates a dramatic decrease in the required cooking time. But previous fast pasta cooking devices are relatively energy inefficient as they discharge the heat energy of the vapor released upon depressurization of the pressure cooking chamber. Also, the previous designs utilize hinged doors for releasing cooked pasta discharge from the cooking vessel. These hinged doors add manufacturing complexity/expense and increase the machines manual cleaning requirements.

As a result, there exists a need for improvements over the prior art and more particularly for a more efficient and expedient automated pasta cooking and dispensing device that consistently produces a quality product.

SUMMARY

A device for making and dispensing pasta is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a device for making and dispensing pasta is disclosed. The device for making and dispensing pasta comprises: (1) a pressure cooking vessel having a top opening and an interior volume; (2) a ball valve assembly comprising: i) a valve body coupled to the top opening of the vessel, ii) a rotatable ball securely located within the valve body and rotatable between an open position and a closed position, the ball having a bore extending through the ball, wherein in the open position the bore provides access to the top opening of the vessel, and in the closed position the ball hermetically seals the top opening; (3) a means for dropping a predetermined amount of pasta through the bore of the ball and into the top opening of the vessel, when the ball is in the open position; (4) a means for rotating the ball to the closed position after the vessel has accepted the pasta; (5) a means for heating the interior volume of the vessel to cook the pasta; and (6) a means for providing egress of the pasta from the device after the vessel has cooked the pasta.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the disclosed embodiments. The embodiments illustrated herein are presently preferred, it being understood, however, that the claimed subject matter is not limited to the precise arrangements and instrumentalities shown, wherein:

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing an automated device for making and dispensing pasta that consistently produces a high quality final product that does not vary substantially from time to time or from dish to dish. The disclosed embodiments also reduce or eliminate the need for using certain staff, which increases the profitability of the system. Further, the disclosed embodiments eliminate the use of a hinged door used to remove pasta from the cooking vessel, thereby reducing manufacturing complexity/expense and decreasing the manual cleaning requirements of the machine. Also, the disclosed embodiments enable a user to quickly and effectively scale the system to meet greater demand for pasta. The disclosed embodiments are also simplified, economical to manufacture, and easy to maintain. Further, the disclosed embodiments provide reliable performance, and are practicable for commercial use.

Figure 1A:
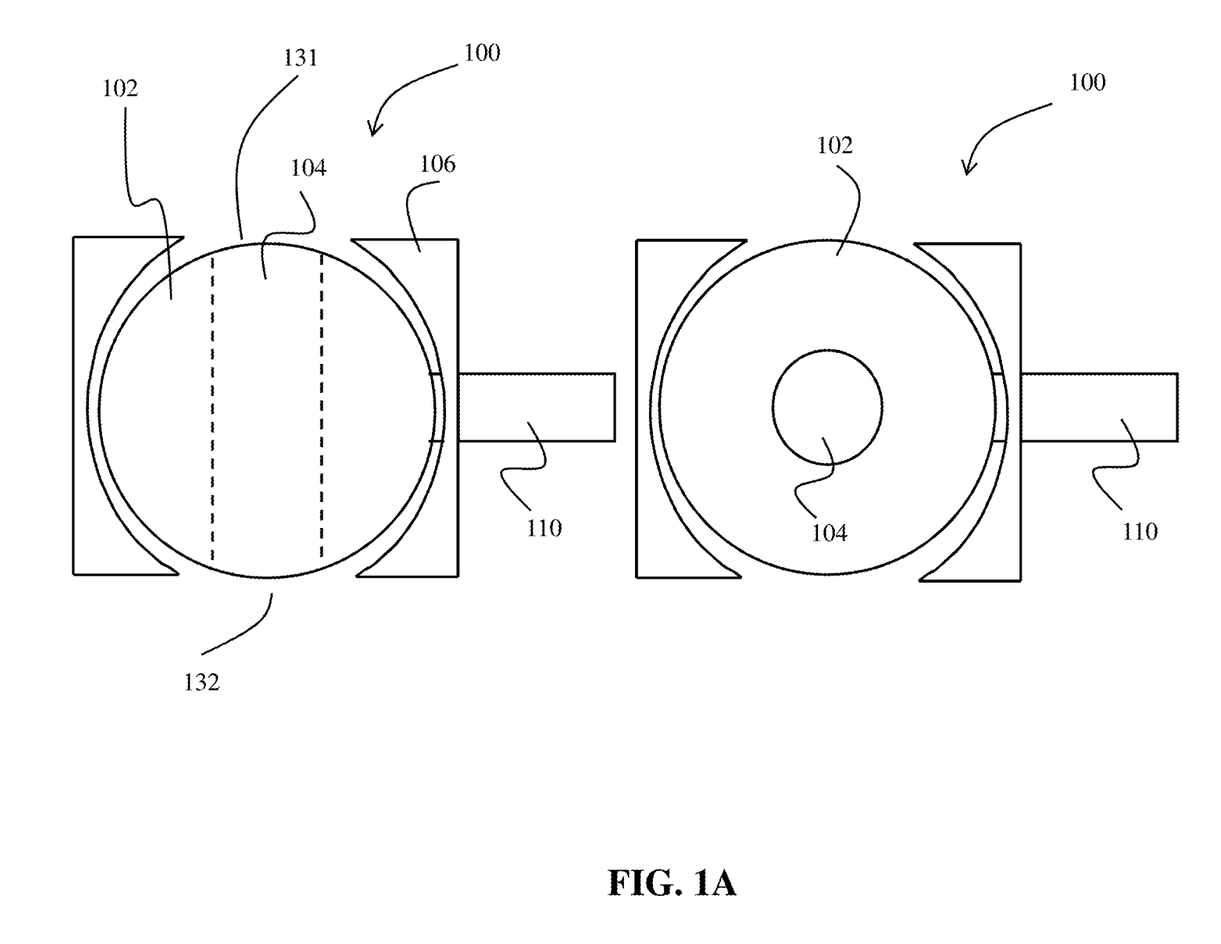
FIG. 1A is a diagram of a ball valve used in the device for making and dispensing pasta, according to an example embodiment.

Referring now to the Figures, FIG. 1A is a diagram of a ball valve 100 used in the device for making and dispensing pasta, according to an example embodiment. A ball valve is a form of quarter-turn valve which uses a hollow, perforated and pivoting ball to control flow through it. A ball valve is open when the ball's hole is in line with the flow and closed when it is pivoted 90-degrees by the stem or valve handle. The ball valve 100 may be a single body, three-piece body, split body, top entry, or welded ball valve. The valve body may be made of metal, plastic, or metal with a ceramic. The ball may be made of similar material as the valve body, or may be chrome plated for durability.

FIG. 1 shows that the ball valve 100 includes a rotating ball 102, which includes a bore 104 that extends through the ball. The bore 104 may be a straight cylindrical orifice that extends through the center of the ball. A stem 110 comprises a shaft that is used to rotate the ball 102. The stem may be perpendicular to the bore 104.

The ball sits, or is held, securely within the valve body 106 such that the ball contacts the valve body and makes a hermetic seal where the ball contacts the valve body. Although FIG. 1A shows a gap between the ball and the valve body, this is for illustrative purposes only, as there is actually no gap where the ball contacts the valve body to make a hermetic seal. The diagram on the left of FIG. 1A shows the ball is rotated such that the bore points upwards (the open position), while the diagram on the right of FIG. 1A shows the ball is rotated 90 degrees form the open position such that the bore points into the plane of the page (the closed position). When the valve is in the open position, the bore has an interior volume that is continuous with the openings 131, 132 in the top and bottom of the valve body 106. When the valve is in the closed position, the bore has an interior volume that is closed off or sealed, since a hermetic seal is made where the ball contacts the valve body.

Figure 1B:
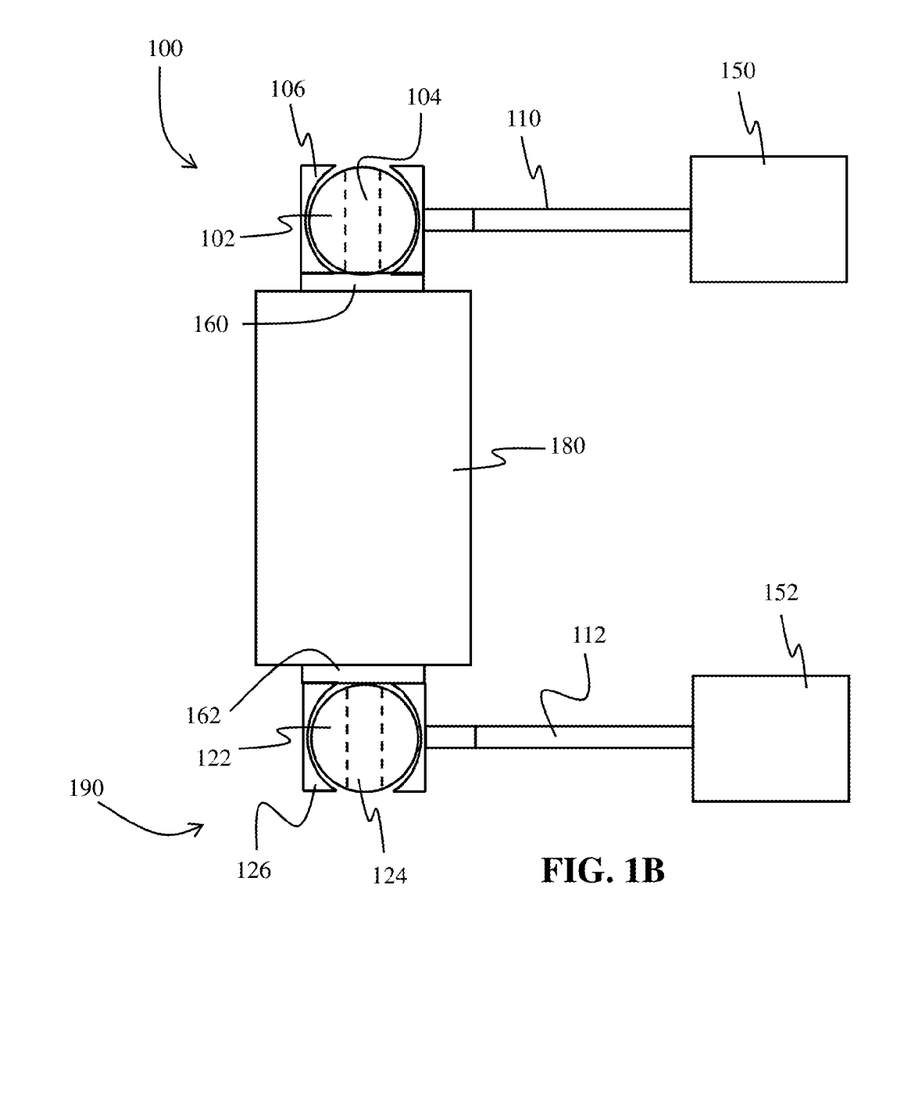
FIG. 1B is a diagram of a cooking vessel with ball valves used in the device for making and dispensing pasta, according to an example embodiment.

FIG. 1B is a diagram of a cooking vessel 180 with ball valves 100, 190 used in the device for making and dispensing pasta, according to an example embodiment. FIG. 1B shows a vessel 180, which may be a cooking vessel that may be sealed so as to allow pressure cooking. Pressure cooking is the process of cooking food, using water or other cooking liquid, in a sealed vessel. The vessel 180 may be used for cooking food faster than conventional cooking methods, which also saves energy. Pressure is created by boiling a liquid, such as water or broth, or placing a boiling liquid, inside the vessel. The trapped steam increases the internal pressure and temperature. After use, the pressure is slowly released so that the vessel can be safely opened. Almost any food which can be cooked in steam or water-based liquids can be cooked in the vessel.

The ball valve 100 is located at the top of the vessel and a similar ball valve 190 may be located at the bottom of the vessel. The first ball valve 100 is connected to the vessel 180 via a connector 160, which forms a hermetic seal between the vessel 180 and the valve body 106. The stem 110 of the ball valve 100 may be rotated by the servo 150. The second ball valve 190 may also include a ball 122 with a bore 124 that sits securely within a valve body 126. The second ball valve 190 is connected to the vessel 180 via a connector 162, which forms a hermetic seal between the vessel 180 and the valve body 126. The stem 112 of the ball valve 190 may be rotated by the servo 152.

Figure 1C:
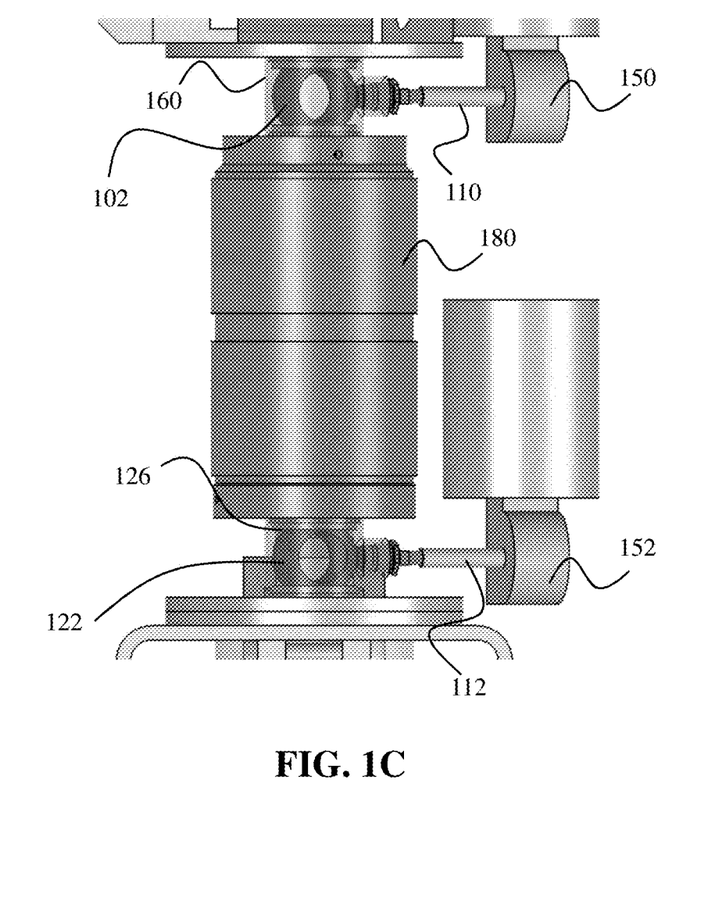
FIG. 1C is a rendering of a cooking vessel with ball valves used in the device for making and dispensing pasta, according to an example embodiment.

When the first ball valve 100 is in the open position, the bore 104 has an interior volume that is continuous with the interior volume of the vessel 180, such that items such as pasta may be dropped into the vessel 180. When the second ball valve 190 is in the open position, the bore 124 has an interior volume that is continuous with the interior volume of the vessel 180, such that items such as pasta may fall out of the vessel 180. When the first ball valve 100 and the second ball valve 190 are in the closed position, the interior volume of the vessel 180 is hermetically sealed and may be pressurized for cooking. FIG. 1C is a three dimensional rendering of the cooking vessel with ball valves described in FIGS. 1A and 1B above. Note that although FIG. 1B shows two servos 150, 152, the ball valves 100, 190 may be rotated or activated using other means, such as an electric motor, or the like.

Figure 2A:
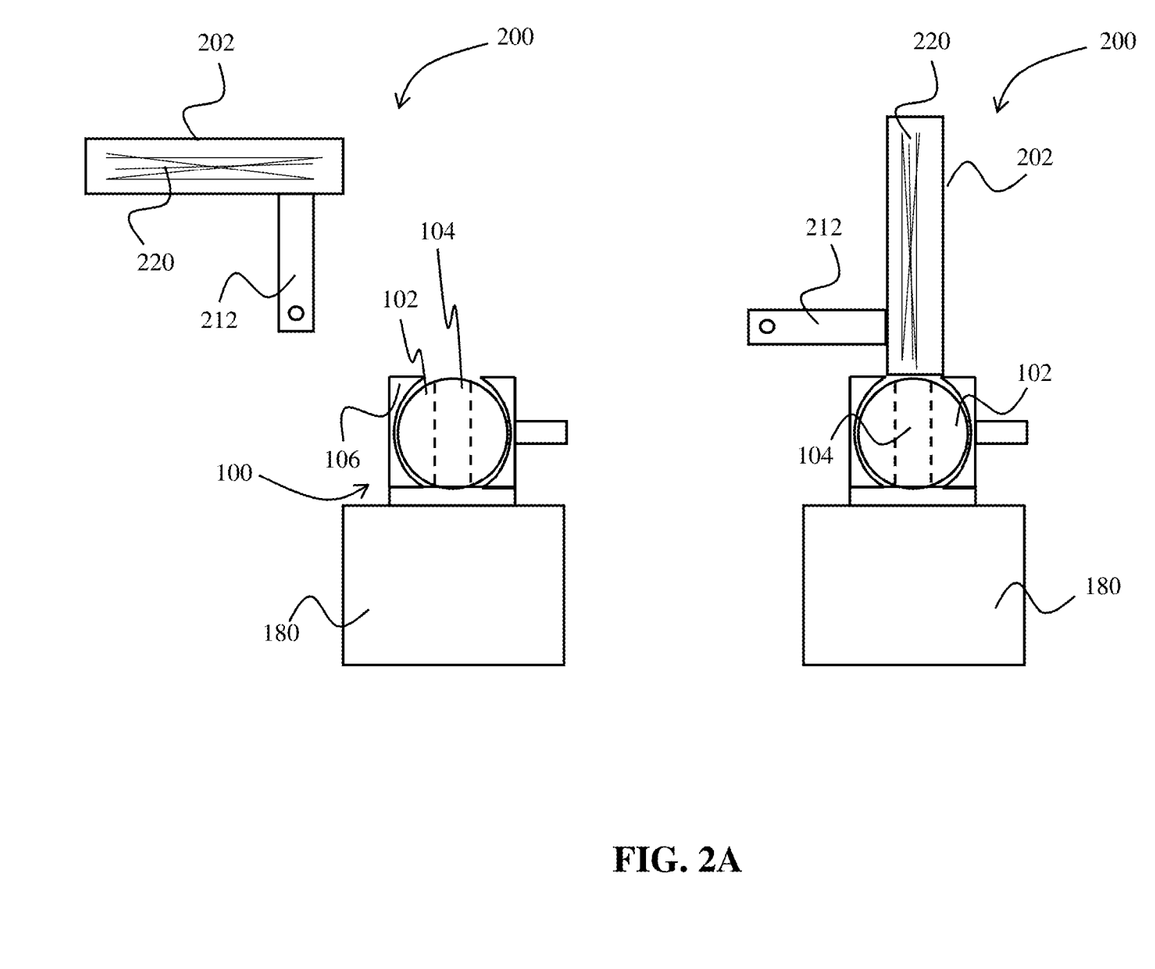
FIG. 2A is a diagram of a pasta portion device with a ball valve used in the device for making and dispensing pasta, according to an example embodiment.
Figure 2B:
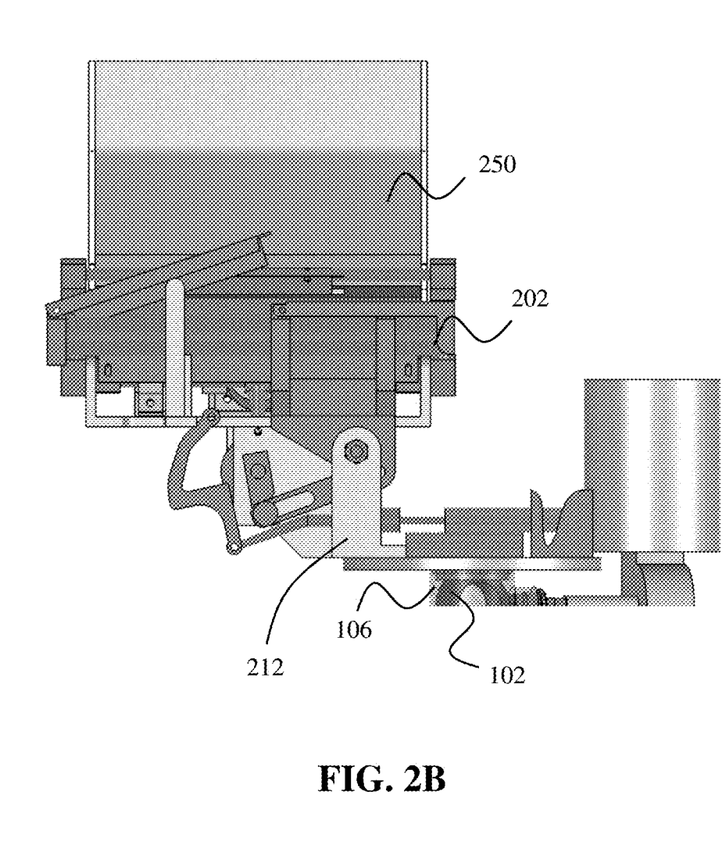
FIG. 2B is a rendering of a pasta portion device with a ball valve used in the device for making and dispensing pasta, according to an example embodiment.

FIG. 2A is a diagram of a pasta portion device 200 with a ball valve used in the device for making and dispensing pasta, according to an example embodiment. FIG. 2A shows that the pasta portion device 200 includes a cylindrical device 202 or tube for holding uncooked pasta 220 (the pasta shown in FIG. 2A is the type known as spaghetti, which comprises long, straight and thin shafts of pasta). The tube 202 is held by an arm 212 that rotates so as to rotate the tube from a horizontal position (left side figure of FIG. 2A) to the vertical position (the right side figure of FIG. 2A). When the tube 202 is rotated from a horizontal position (left side figure of FIG. 2A) to the vertical position (the right side figure of FIG. 2A), and the first ball valve 100 is in the open position, the bore 104 has an interior volume that is continuous with the interior volume of the vessel 180, such that the pasta 220 may be dropped from tube 202 through the ball 102 and into the vessel 180. FIG. 2B is a three dimensional rendering of the pasta portion device 202 described in FIG. 2A above. In one embodiment, the interior volume of the device 202 is shaped cylindrically to be commensurate with the cylindrical shape of the bore 104, thereby allowing for the pasta 220 to fall easily from the device 202 into the vessel 180.

FIG. 2B also shows a pasta holder 250, which holds a larger amount of pasta, from which may be transferred small portions of pasta to the cylindrical device 202 or tube for holding uncooked pasta 220. In one embodiment, a sensor (such as in device 202 or in the pasta holder 250) detects when pasta 220 is no longer in the device 202, and subsequently a door or latch in the device 250 opens to allow small portions of pasta 220 to fall from device 250 to the cylindrical device 202 or tube.

Figure 3A:
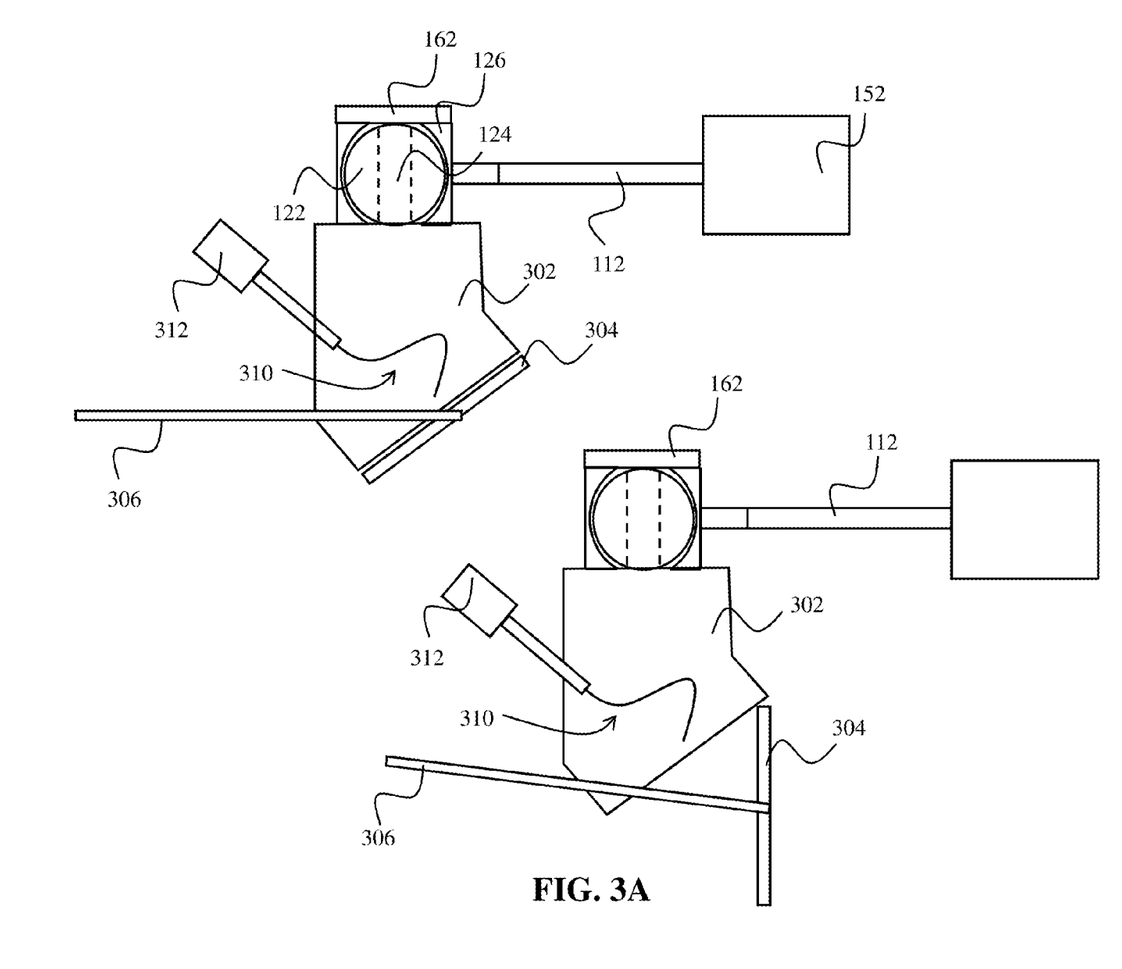
FIG. 3A is a diagram of a basket and mixing device with a ball valve used in the device for making and dispensing pasta, according to an example embodiment.
Figure 3B:
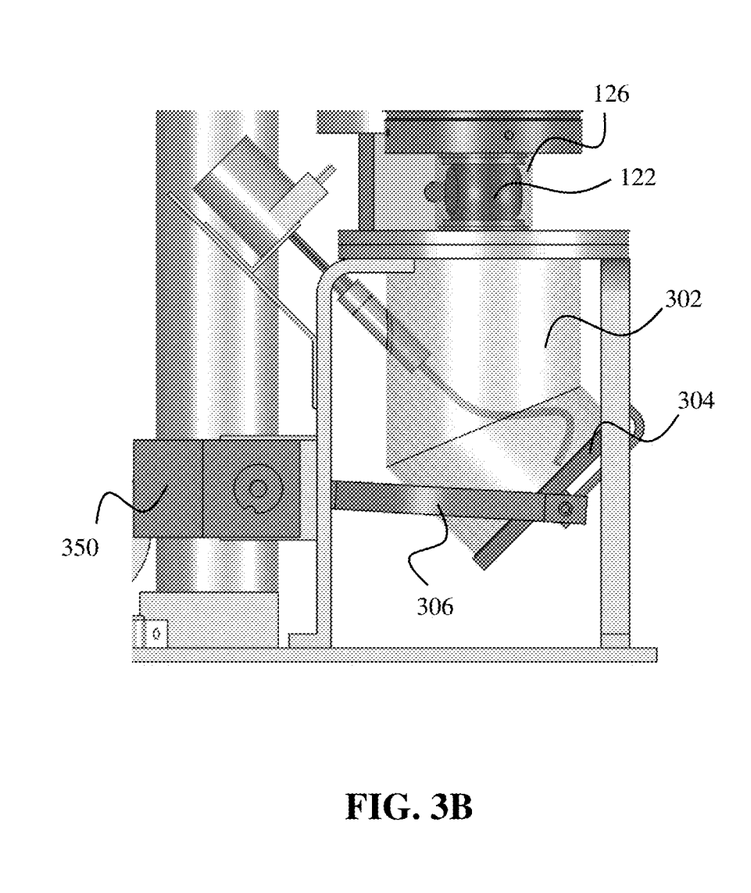
FIG. 3B is a rendering of a basket and mixing device with a ball valve used in the device for making and dispensing pasta, according to an example embodiment.

FIG. 3A is a diagram of a basket 302 and mixing device 310 with a ball valve used in the device for making and dispensing pasta, according to an example embodiment. FIG. 3A shows a basket 302 located under the ball valve 190. After the pasta is cooked by the cooking vessel, and the second ball valve 190 is rotated (by servo 152) to the open position, the bore 124 has an interior volume that is continuous with the interior volume of the vessel 180, such that the pasta 220 may be dropped from vessel 180 through the bore 124 of ball 122 and into the basket 302. A mixing device 310 may be powered by servo 312 and may be used to mix the pasta 220 after it has been cooked and dropped into the basket. Thereafter, arm 306, which is connected to door 304 at the bottom of the basket 302, may be used to open the door 304 so as to allow the cooked pasta 220 to fall out of the basket and onto a container such as a serving plate. FIG. 3B is a three dimensional rendering of the basket 302 and mixing device 310 described in FIG. 3A above. FIG. 3B also shows a servo 350 which may operate the arm 306 that opens and closes the door 304 at the bottom of the basket 302.

Figure 4:
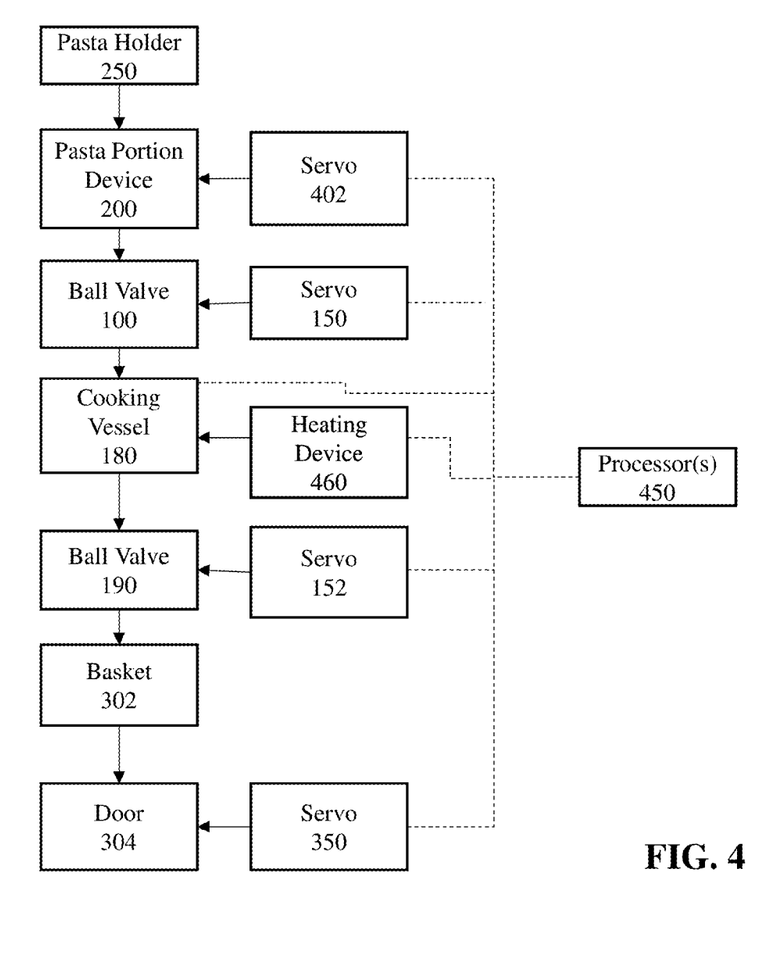
FIG. 4 is a block diagram of the main components the device for making and dispensing pasta, according to an example embodiment.

FIG. 4 is a block diagram of the main components the device for making and dispensing pasta, according to an example embodiment. FIG. 4 shows processor(s) 450 which may comprise one or more processors or computing devices (referred to herein as the "processor"). The processor(s) may be one or more programmable logic controllers, ASICs, digital computers, or computing devices 600 described below.

FIG. 4 shows that servo 402 controls the pasta portion device 200, servo 150 controls the ball valve 100, servo 152 controls the ball valve 190 and servo 350 controls the door 304. Processor 450 is connected to the servos 402, 150, 152 and 350 and operate said servos according to a set of instructions and according to feedback received from said servos. A servo is an automatic device that uses error-sensing negative feedback to correct the performance of a mechanism. Servos 402, 150, 152 and 350 may alternatively be a hydraulic cylinder, a mechanical actuator, an electric motor, or the like.

Processor 450 is also connected to heating device 460 which heats the cooking vessel 180. This step entails the transfer of hot or boiling water from a holding device to the cooking vessel 180. When the processor determines from data it has received from sensors and/or from a timing device that the pasta is done cooking, the processor depressurizes the cooking vessel 180. FIG. 4 shows that processor 450 is connected to the vessel 180 as well. Sensors within vessel 180, as well as device 460, may send data to the processor regarding temperature, pressure, time, humidity, etc. The dotted lines in FIG. 4 indicates communications or electrical lines.

Figure 5:
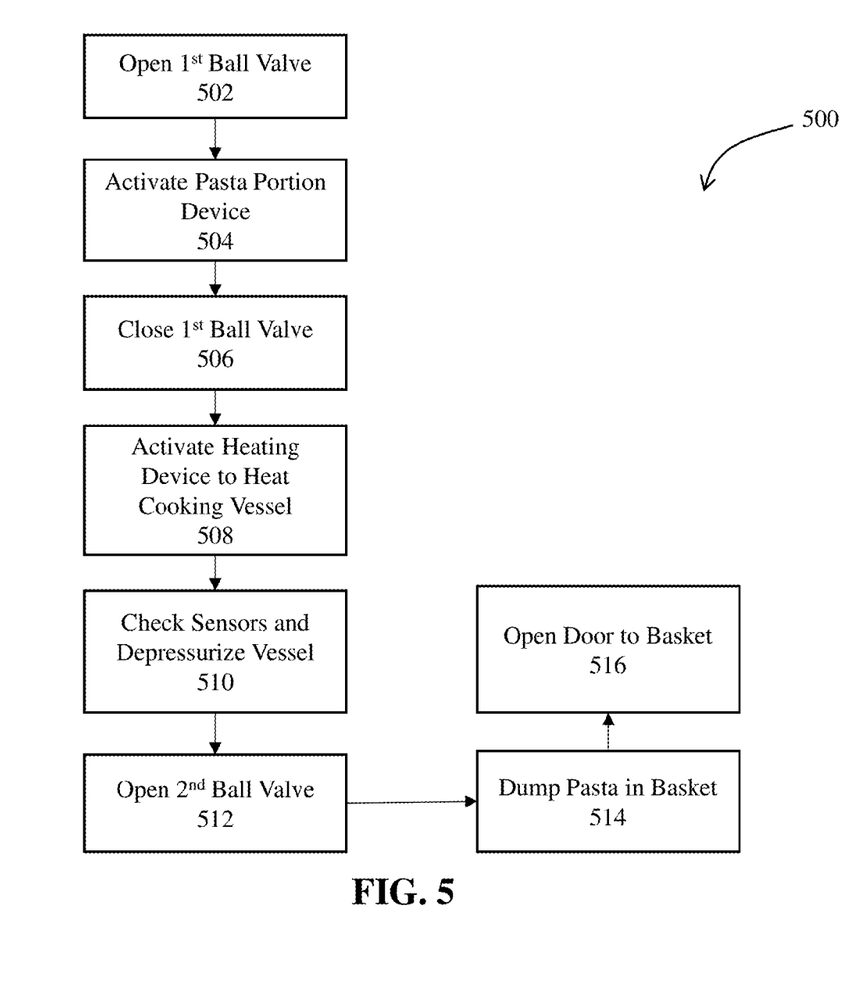
FIG. 5 is a flowchart of the process performed by the device for making and dispensing pasta, according to an example embodiment.

FIG. 5 is a flowchart of the process 500 performed by the device for making and dispensing pasta, according to an example embodiment. Before the flowchart of FIG. 5 begins, it is assumed that the $2^{nd}$ ball valve 190 is closed. The flowchart of FIG. 5 begins with step 502 wherein the processor 450 may receive a command to begin the process of making and dispensing pasta and therefore the processor sends a command to the servo 150 to open the ball valve 100. Next, in step 504, the processor sends a command to the servo 402 to activate the pasta portion device 200, which entails having a portion of pasta drop from the pasta holder 250 into the pasta portion device 200, and then rotating the device 202 from the horizontal position to the vertical position, such that the pasta in the device 202 drops through the bore in the ball of the ball valve 100 and into the cooking vessel 180.

Then, in step 506, the processor sends a command to the servo 150 to close the ball valve 100. At this point, the cooking vessel may be pressurized or heated, since it is hermetically sealed. In step 508, the processor sends a command to the heating device 460 to begin heating the cooking vessel 180. This step entails the transfer of hot or boiling water from a holding device to the cooking vessel 180. When the processor determines from data it has received from sensors and/or from a timing device that the pasta is done cooking, the processor depressurizes the cooking vessel 180 in step 510. In one optional step, the processor may send a command to servo 312 to activate the mixer 310 so as to mix the cooked pasta in the basket.

In step 512 the processor sends a command to the servo 150 to open the ball valve 190. In step 514, the pasta falls from the cooking vessel through the bore in the ball of the ball valve 190 and into the basket 302. In step 516, the processor sends a command to the servo 350 to open the door 304, which results in the cooked pasta falling out of the basket and onto a container, such as a serving plate.

Figure 6:
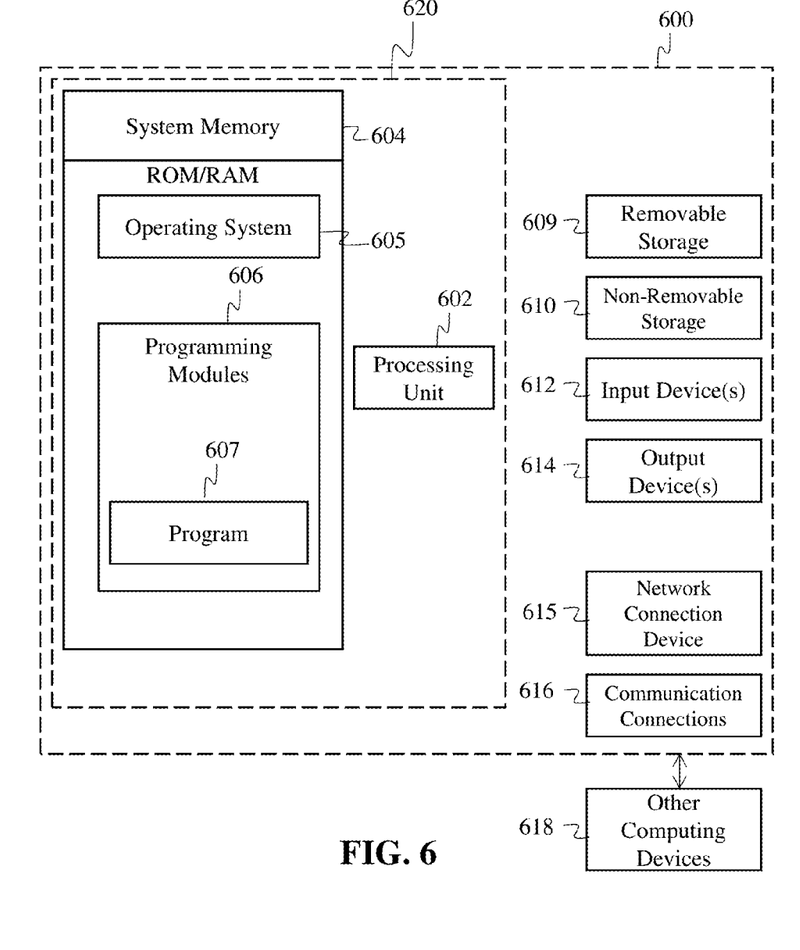
FIG. 6 is a block diagram of a computing device useful for implementing the device for making and dispensing pasta, according to an example embodiment.

FIG. 6 is a block diagram of a computing device 600 useful for implementing the device for making and dispensing pasta, according to an example embodiment. Consistent with the embodiments described herein, the aforementioned actions performed by processor(s) 450 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for the disclosed embodiments and the processes of FIGS. 4-5, as described above. Process 500 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of processor(s) 450. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes of FIGS. 4-5 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments, for example, are described above with reference to block diagrams and/or operational illustrations of methods, systems, and computer program products according to embodiments herein. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A device for making and dispensing pasta, comprising:
   (1) a pressure cooking vessel having a top opening, a bottom opening and an interior volume;
   (2) a first ball valve assembly comprising: i) a first valve body coupled to the top opening of the vessel, ii) a first rotatable ball securely located within the first valve body and rotatable between an open position and a closed position, the first ball having a first bore extending through the first ball, wherein in the open position the first bore provides access to the top opening of the vessel, and in the closed position the first ball hermetically seals the top opening;
   (3) a device configured for dropping a predetermined amount of pasta through the bore of the ball and into the top opening of the vessel, when the ball is in the open position, the device comprising a tube configured for holding a predetermined amount of pasta such that said pasta is situated along a longitudinal axis of the tube, and an elongated arm coupled perpendicularly to the tube, wherein the tube is initially positioned horizontally, and wherein when the ball is in the open position, the arm rotates so as to position the tube vertically over the bore of the ball, configured such that the pasta falls from the tube, through the bore of the ball and into the top opening of the vessel;
   (4) a first servo for rotating the first ball to the closed position after the vessel has accepted the pasta;
   (5) a heating device configured for heating the interior volume of the vessel to cook the pasta using boiling water;
   (6) a second ball valve assembly comprising: i) a second valve body coupled to the bottom opening of the vessel, ii) a second rotatable ball securely located within the second valve body and rotatable between an open position and a closed position, the second ball having a second bore extending through the second ball, wherein in the open position the second bore provides access to the bottom opening of the vessel, and in the closed position the second ball hermetically seals the bottom opening;
   (7) a second servo configured for rotating the second ball to the open position after the vessel has cooked the pasta, so as to allow the pasta to fall out of the vessel and through the second bore;
   (8) a basket configured for holding the pasta after the pasta has exited the vessel;
   (9) a servo coupled to a mixing element located in the basket, wherein the servo is configured for rotating the mixing element so as to mix the pasta in the basket;
   (10) a door configured for providing egress of the pasta from the device after the vessel has cooked the pasta wherein said door is located at the bottom of the vessel, and wherein the door is opened after the second ball has been rotated to the open position.

2. The device of claim 1, wherein the first valve body is coupled to the top opening of the vessel so as to make a hermetic seal between the first valve body and the vessel.

3. The device of claim 2, wherein the first rotatable ball is securely located within the first valve body so as to make a hermetic seal between the first rotatable ball and the first valve body.

* * * * *